(12) United States Patent
Slavenburg et al.

(10) Patent No.: US 8,581,833 B2
(45) Date of Patent: Nov. 12, 2013

(54) SYSTEM, METHOD, AND COMPUTER PROGRAM PRODUCT FOR CONTROLLING STEREO GLASSES SHUTTERS

(75) Inventors: Gerrit A. Slavenburg, Los Altos, CA (US); Thomas F. Fox, Palo Alto, CA (US); David Robert Cook, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 300 days.

(21) Appl. No.: 12/765,771

(22) Filed: Apr. 22, 2010

(65) Prior Publication Data

US 2010/0201791 A1 Aug. 12, 2010

Related U.S. Application Data

(63) Continuation of application No. 11/462,529, filed on Aug. 4, 2006, now Pat. No. 7,724,211.

(60) Provisional application No. 60/787,730, filed on Mar. 29, 2006.

(51) Int. Cl.
*G09G 5/36* (2006.01)

(52) U.S. Cl.
USPC ............................. 345/107; 345/204; 348/51

(58) Field of Classification Search
USPC ......................................... 345/9, 109; 348/51
See application file for complete search history.

(56) References Cited

U.S. PATENT DOCUMENTS

| | | | |
|---|---|---|---|
| 4,912,557 A | 3/1990 | Faroudja | |
| 5,486,868 A | 1/1996 | Shyu et al. | |
| 5,568,314 A | 10/1996 | Omori et al. | |
| 5,796,373 A | 8/1998 | Ming-Yen | |
| 5,878,216 A | 3/1999 | Young et al. | |
| 5,943,504 A | 8/1999 | Flurry et al. | |
| 5,976,017 A | 11/1999 | Omori et al. | |
| 6,011,581 A | 1/2000 | Swift et al. | |
| 6,529,175 B2 | 3/2003 | Tserkovnyuk et al. | |
| 6,532,008 B1 | 3/2003 | Guralnick | |

(Continued)

FOREIGN PATENT DOCUMENTS

| | | |
|---|---|---|
| EP | 1363264 A2 | 11/2003 |
| EP | 2228998 A2 | 9/2010 |

(Continued)

OTHER PUBLICATIONS

Notice of Preliminary Rejection from Korean Application No. 10-2007-31168 dated Aug. 5, 2010.

(Continued)

*Primary Examiner* — Amare Mengistu
*Assistant Examiner* — Joseph G Rodriguez
(74) *Attorney, Agent, or Firm* — Zilka-Kotab, PC

(57) ABSTRACT

A system, method, and computer program product are provided for controlling stereo glasses shutters. In use, a right eye shutter of stereo glasses is controlled to switch between a closed orientation and an open orientation. Further, a left eye shutter of the stereo glasses is controlled to switch between the closed orientation and the open orientation. To this end, the right eye shutter and the left eye shutter of the stereo glasses may be controlled such that the right eye shutter and the left eye shutter simultaneously remain in the closed orientation for a predetermined amount of time.

16 Claims, 6 Drawing Sheets

(56) References Cited

U.S. PATENT DOCUMENTS

| | | | |
|---|---|---|---|
| 6,977,629 B2 | 12/2005 | Weitbruch et al. | |
| 7,061,477 B1* | 6/2006 | Noguchi | 345/204 |
| 7,103,702 B2 | 9/2006 | Funamoto | |
| 7,215,356 B2* | 5/2007 | Lin et al. | 348/51 |
| 7,256,791 B2 | 8/2007 | Sullivan et al. | |
| 7,385,625 B2* | 6/2008 | Ohmura et al. | 348/51 |
| 7,490,296 B2 | 2/2009 | Feldman et al. | |
| 7,502,010 B2 | 3/2009 | Kirk | |
| 7,532,209 B2 | 5/2009 | Kimura | |
| 8,169,467 B2 | 5/2012 | Slavenburg et al. | |
| 2002/0007723 A1 | 1/2002 | Ludwig | |
| 2002/0196199 A1 | 12/2002 | Weitbruch et al. | |
| 2003/0038807 A1 | 2/2003 | Demos et al. | |
| 2003/0214465 A1 | 11/2003 | Kimura | |
| 2004/0130645 A1 | 7/2004 | Ohmura et al. | |
| 2004/0150670 A1 | 8/2004 | Feldman et al. | |
| 2006/0072006 A1 | 4/2006 | Lin et al. | |
| 2006/0146003 A1 | 7/2006 | Diefenbaugh et al. | |
| 2007/0091058 A1 | 4/2007 | Nam et al. | |
| 2007/0229487 A1 | 10/2007 | Slavenburg et al. | |
| 2009/0132951 A1 | 5/2009 | Feldman et al. | |
| 2009/0150776 A1 | 6/2009 | Feldman et al. | |
| 2009/0150777 A1 | 6/2009 | Feldman et al. | |
| 2010/0066820 A1 | 3/2010 | Park et al. | |
| 2010/0231696 A1 | 9/2010 | Slavenburg et al. | |
| 2011/0012904 A1 | 1/2011 | Slavenburg et al. | |
| 2011/0310234 A1 | 12/2011 | Sarma et al. | |
| 2012/0038624 A1 | 2/2012 | Slavenburg | |
| 2012/0075437 A1 | 3/2012 | Slavenburg et al. | |
| 2013/0038684 A1 | 2/2013 | Slavenburg | |

FOREIGN PATENT DOCUMENTS

| | | |
|---|---|---|
| EP | 2262272 A2 | 12/2010 |
| EP | 2362666 A1 | 8/2011 |
| EP | 2365697 A2 | 9/2011 |
| GB | 2475367 A | 5/2011 |
| JP | 01073892 A2 | 3/1989 |
| JP | H09-051552 | 2/1997 |
| JP | 2000-004451 | 1/2000 |
| JP | 2000284224 A2 | 10/2000 |
| JP | 2001045524 A2 | 2/2001 |
| JP | 2001154640 A2 | 6/2001 |
| JP | 2007110683 A2 | 4/2007 |
| KR | 20040001831 A | 1/2004 |
| KR | 20060007662 A | 1/2006 |
| KR | 20070077863 A | 7/2007 |
| WO | 99/31884 A1 | 6/1999 |
| WO | 2009069026 A2 | 6/2009 |
| WO | 2010032927 A2 | 3/2010 |

OTHER PUBLICATIONS

Office Action from Chinese Application No. 200780001629.6 dated Feb. 24, 2010.
David R. Cook, U.S. Appl. No. 11/532,005, filed Sep. 14, 2006.
David R. Cook, U.S. Appl. No. 11/531,995, filed Sep. 14, 2006.
Gerrit Slavenburg, U.S. Appl. No. 12/854,100, filed Aug. 10, 2010.
International Search Report and Written Opinion from International Application No. PCT/US07/07702 mailed on Apr. 2, 2008 (10 pages).
Notice of Reasons for Rejection from Japanese Application No. 2009-502980 mailed on Feb. 8, 2011 (3 pages).
Notice of Preliminary Rejection from Korean Application No. 10-2010-0092504 mailed on Dec. 28, 2010 (4 pages).
Notice of Preliminary Rejection from Korean Application No. 10-2007-0031168 mailed Jul. 22, 2010 (7 pages).
Extended European Search Report from Application No. 07754251.2 mailed on Sep. 9, 2009 (7 pages).
European Office Action from Application No. 07754251.2 mailed Jul. 12, 2010 (5 pages).
Final Notice of Reasons for Rejection from Japanese Application No. 2009-502980 mailed Jun. 21, 2011 (2 pages).
Non-Final Office Action from U.S. Appl. No. 11/462,535 dated May 24, 2011 (27 pages).
i-O Display Systems, "Featured Products", retrieved from http://web.archive.org/web/20060812053513/http://www.i-glassesstore.com/index.html on Aug. 12, 2006, (2 pages).
International Telecommunication Union: "Characteristics of B,G/PAL and M/NTSC Television System (Excerpt from ITU-R BT.470-5 Conventional Television Systems)", Feb. 1998, retrieved from http://www.kolumbus.fi/pami1/video/pal_ntsc.html on Jun. 8, 2011, (5 pages).
Video Electronics Standards Association (VESA), "Coordinated Video Timings (CVT) Standard V1.1", Sep. 10, 2003, Milpitas, CA, USA, retrieved from http://web.archive.org/web/20040204215505/http://www.vesa.org/summary/sumcvt.htm on Jun. 8, 2011, (5 pages).
Non-Final Office Action from U.S. Appl. No. 11/462,535, dated Oct. 26, 2011.
Office Action from Canadian Patent Application No. 2,646,439, dated Oct. 28, 2011.
Examination Report from European Patent Application No. 07 754 251.2, dated Dec. 7, 2010.
Notice of Preliminary Rejection from Korean Patent Application No. 10-2007-0031168, dated Jul. 22, 2010.
Office Action from Taiwan Patent Application No. 096111054, dated Oct. 31, 2011.
Notice of Allowance from Korean Patent Application No. 10-2010-0092504, dated Sep. 28, 2011.
Decision to Grant from Japanese Patent Application No. 2009-502980, dated Sep. 20, 2011.
U.S. Appl. No. 13/248,960, filed Sep. 29, 2011.
U.S. Appl. No. 13/247,907, filed Sep. 28, 2011.
U.S. Appl. No. 13/311,451, filed Dec. 5, 2011.
Notice of Grant of Patent Rights for Invention from Chinese application No. 200780001629.6 issued Aug. 13, 2010.
Non-Final Office Action from U.S. Appl. No. 12/854,100, dated Mar. 16, 2012.
Notice of Allowance from U.S. Appl. No. 11/462,535, dated Mar. 2, 2012.
Non-Final Office Action from U.S. Appl. No. 12/787,346, dated Jun. 8, 2012.
Notice of Grant from Chinese Patent Application No. 201010522450.9, dated Jul. 19, 2012.
Office Action from Chinese Patent Application No. 201010522450.9, dated Dec. 23, 2011.
Notice of Allowance from Taiwan Patent Application No. 096111054, dated Feb. 29, 2012.
Notice of Allowance from Korean Patent Application No. 10-2007-0031168, date Jan. 13, 2011.
Combined Search and Examination Report from UK Patent Application No. GB1112746.1, dated Nov. 10, 2011.
Advisory Action from U.S. Appl. No. 12/787,346, dated Apr. 25, 2013.
Decision to Refuse from European Patent Application No. 07 754 251.2, dated Apr. 11, 2013.
Final Office Action from U.S. Appl. No. 12/854,100, dated Aug. 27, 2012.
Notice of Final Rejection from Korean Patent Application No. 10-2011-0078998, dated Mar. 28, 2013.
Notice of Preliminary Rejection from Korean Patent Application No. 10-2011-0078998, dated Aug. 10, 2012.
Final Office Action from U.S. Appl. No. 12/787,346, dated Jan. 9, 2013.
Non-Final Office Action from U.S. Appl. No. 13/311,451, dated Nov. 21, 2012.
Non-Final Office Action from U.S. Appl. No. 12/892,147, dated Dec. 31, 2012.
Advisory Action from U.S. Appl. No. 12/854,100, dated Nov. 21, 2012.
Notice of Reasons for Rejection from Japanese Patent Application No. 2011-161191, dated Dec. 18, 2012.

(56) References Cited

OTHER PUBLICATIONS

Summons to Attend Oral Proceedings from European Patent Application No. 07754251.2, dated Oct. 8, 2012.
Notice of Allowance from U.S. Appl. No. 12/787,346, dated Jul. 9, 2013.
Final Office Action from U.S. Appl. No. 12/892,147, dated Sep. 4, 2013.
Advisory Action from U.S. Appl. No. 13/311,451, dated Sep. 6, 2013.
Examination Report from GB Patent Application No. 1112746.1, dated Jul. 25, 2013.
Notice of Rejection from Japanese Patent Application No. 2011-161191, dated Sep. 17, 2013.
Notice of Allowance from Korean Patent Application No. 10-2011-0078998, date Jul. 24, 2013.

* cited by examiner

SYSTEM, METHOD, AND COMPUTER PROGRAM PRODUCT FOR CONTROLLING STEREO GLASSES SHUTTERS

RELATED APPLICATION(S)

The present application is a continuation of an application filed Aug. 4, 2006 now U.S. Pat. No. 7,724,211 under application Ser. No. 11/462,529, which, in turn, claims priority of a provisional application filed Mar. 29, 2006 under application Ser. No. 60/787,730, which is incorporated herein by reference in its entirety.

FIELD OF THE INVENTION

The present invention relates to video displays, and more particularly to viewing stereo video and graphics images utilizing stereo shutter glasses.

BACKGROUND

Various display devices are equipped for both mono and stereo viewing. Unlike mono viewing, stereo viewing involves the display of separate content for the right and left human eye. Specifically, such stereo viewing requires the presentation of a separate image to the left and right human eye. In one particular type of stereo viewing, namely time sequential stereo, such left and right images are presented in an alternating manner. To ensure a proper stereo viewing experience, alternating shutter glasses are also typically used which make the left image visible to the left eye and the right image to the right eye at the appropriate time.

In the past, time sequential stereo viewing has worked well on CRTs and related displays [e.g. high frame rate (DLP) projectors, etc.]. However, time sequential stereo viewing has not shown promise with liquid crystal displays (LCDs), whether flat-panel or in the form of a projector, due to several issues. For example, a slow response time of pixels in LCD environments causes 'ghosting' of the left image in the right view, and visa versa. Still yet, the nature of the LCD update process unfortunately results in only short periods of time when the right image and left image may be present in their entirety, as will now be described in more detail.

FIG. 1A illustrates hypothetical shortcomings that would exist if stereo viewing were attempted utilizing an LCD. As shown in the present hypothetical example, the LCD would receive pixels in raster scan order (i.e. left to right, line by line from top to bottom, etc.) over a cable 10, such as a digital video interface (DVI) or video graphics array (VGA) cable. A first left image L1 intended for viewing by a left eye is sent over the cable 10 first. Thereafter, there is a pause in transmission called the vertical blanking interval VBI. Next, a first right image R1 intended for the right eye is sent, and so forth.

Unlike CRTs and other related displays, LCD pixels have individual capacitive storage elements that cause each pixel to retain its color and intensity until it is updated by LCD driver-related electronics, which addresses pixels in raster order. Thus, at time T1, when part of the first right image R1 has been sent, the actual image emitted from the LCD screen includes the 'not yet overwritten' (e.g. red) part of first left image L1 at the bottom, and the newly written (e.g. green) part of the first right image R1. Further, at T2, and, in fact, for the entire vertical blanking interval VBI starting at time T2, the display includes only the first right image R1. At time T3, the first right image R1 has been partially overwritten by a second left image L2, in the manner shown. To this end, if the display content at time T1 and T3 were shown to the left or right eye, such eye would unfortunately receive content, at least in part, not intended for such eye.

As mentioned earlier, stereo glasses equipped with right and left eye shutters are often employed to ensure that the proper eye views the appropriate image, during stereo viewing. As shown, in the present hypothetical example, after the first left image L1 is displayed, a left eye shutter control 20 switches the left shutter to an open orientation (during which a right shutter is maintained in a closed orientation). Similarly, after the first right image R1 is displayed, a right eye shutter control 30 switches the right shutter to an open orientation (at which time the left shutter toggles to and is maintained in a closed orientation).

Again, each eye unfortunately, receives content, at least in part, not intended for such eye for a sizeable portion of the duration in which the associated shutter is in the open orientation, resulting in unacceptable stereo viewing. There is thus a need for overcoming these and/or other problems associated with the prior art.

SUMMARY

A system, method, and computer program product are provided for controlling stereo glasses shutters. In use, a right eye shutter of stereo glasses is controlled to switch between a closed orientation and an open orientation. Further, a left eye shutter of the stereo glasses is controlled to also switch between the closed orientation and the open orientation. In use, the right eye shutter and the left eye shutter of the stereo glasses may be controlled such that the right eye shutter and the left eye shutter simultaneously remain in the closed orientation for a predetermined amount of time.

DETAILED DESCRIPTION

Figure 1A:
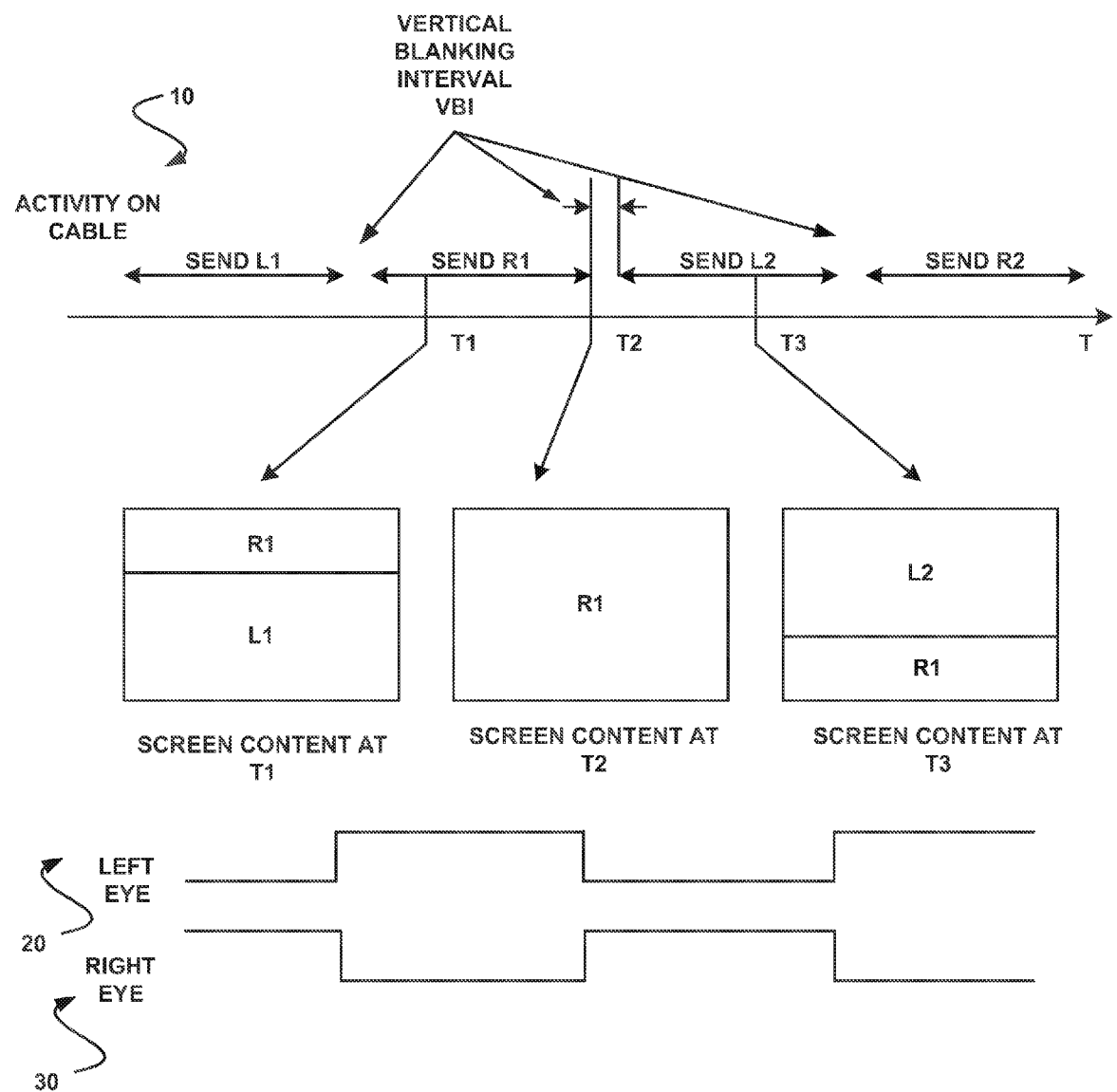
FIG. 1A illustrates hypothetical shortcomings that would exist if stereo viewing were attempted utilizing a liquid crystal display (LCD).

FIG. 1 illustrates an exemplary computer system 100 in which the various architecture and/or functionality of different embodiments may be implemented. As shown, a computer system 100 is provided including at least one host processor 101 which is connected to a communication bus 102. The computer system 100 also includes a main memory 104. Control logic (software) and data are stored in the main memory 104 which may take the form of random access memory (RAM).

The computer system 100 also includes a graphics processor 106 and a display 108 in the form of a liquid crystal display (LCD), digital light processing (DLP) display, liquid crystal on silicon (LCOS) display, plasma display, or other similar display. In one embodiment, the graphics processor 106 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 100 may also include a secondary storage 110. The secondary storage 110 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 104 and/or the secondary storage 110. Such computer programs, when executed, enable the computer system 100 to perform various functions. Memory 104, storage 110 and/or any other storage are possible examples of computer-readable media.

Further included is a pair of stereo glasses 111 capable of being worn on a face of a user. While the stereo glasses 111 are shown to include two elongated members for supporting the same on the face of the user, it should be noted that other constructions (e.g. member-less design, head strap, helmet, etc.) may be used to provide similar or any other type of support. As further shown, the stereo glasses 111 also include a right eye shutter 114 and a left eye shutter 113.

Both the right eye shutter 114 and left eye shutter 113 are capable of both an open orientation and a closed orientation. In use, the open orientation allows more light therethrough with respect to the closed orientation. Of course, such orientations may be achieved by any desired mechanical, electrical, optical, and/or any other mechanism capable of carrying out the above functionality.

For control purposes, the stereo glasses 111 may be coupled to a stereo controller 119 via a cable 118 (or without the cable 118 in a wireless environment). The stereo controller 119 is, in turn, coupled between the graphics processor 106 and the display 108 for carrying out the functionality to be set forth hereinafter. While the stereo controller 119 is shown to reside between the graphics processor 106 and the display 108, it should be noted that the stereo controller 119 may reside in any location associated with the computer system 100, the stereo glasses 111, and/or even in a separate module, particularly (but not necessarily) in an embodiment where the graphics processor 106 is attached to a separate interface [e.g. universal serial bus (USB), etc.] on the computer system 100. In one embodiment, the display 108 may be directly connected to the computer system 100, and the stereo controller 119 may further be directly connected to the computer system 100 via a USB interface. Still yet, the stereo controller 119 may comprise any hardware and/or software capable of the providing the desired functionality.

Specifically, in some embodiments, the right eye shutter 114 and left eye shutter 113 are controlled to switch between the closed orientation and the open orientation. For reasons that will be apparent hereinafter, the right eye shutter 114 and left eye shutter 113 of the stereo glasses 111 may be controlled such that the right eye shutter 114 and left eye shutter 113 simultaneously remain in the closed orientation for a predetermined amount of time. In particular, as will soon become apparent, such technique reduces a duration in which each eye receives content, at least in part, not intended for such eye, resulting in enhanced stereo viewing of content on the display 108.

In addition to and/or instead of the foregoing technique, the stereo controller 119, the display 108, and/or any other appropriate hardware/software associated with the computer system 100 may be equipped with functionality for adapting the display 108 in a way that enhances a viewing experience when display content is viewed utilizing the stereo glasses 111. Specifically, a duration of a vertical blanking interval associated with received display content may be increased for enhancing a viewing experience when the display content is viewed utilizing the stereo glasses 111.

In the context of the present description, the vertical blanking interval may refer to any time duration between the display of content intended for viewing by a right eye and a left eye. In one optional embodiment, such vertical blanking interval may refer to a time duration in which blank lines (and/or other information) are sent across an interface to the display 108. Still yet, in another embodiment, the vertical blanking interval may refer to a time when the content is held on the display 108 and no update occurs. By enlarging the vertical blanking interval (e.g. by sending more blank lines across the aforementioned interface, etc.), the content may be displayed longer for allowing the stereo glasses 111 to remain open longer, thus increasing the apparent brightness to the user, in accordance with one optional embodiment.

More illustrative information will now be set forth regarding various optional architectures and features with which the foregoing functionality may or may not be implemented, per the desires of the user. It should be strongly noted that the following information is set forth for illustrative purposes and should not be construed as limiting in any manner. Any of the following features may be optionally incorporated with or without the exclusion of other features described.

For example, in one embodiment, the architecture and/or functionality of the various following figures may be implemented in the context of the host processor 101, graphics processor 106, a chipset (i.e. a group of integrated circuits designed to work and sold as a unit for performing related functions, etc.), and/or any other integrated circuit for that matter. Still yet, the architecture and/or functionality of the various following figures may be implemented in the context of a general computer system, a circuit board system, a game console system dedicated for entertainment purposes, an application-specific system, and/or any other desired system.

Figure 1B:
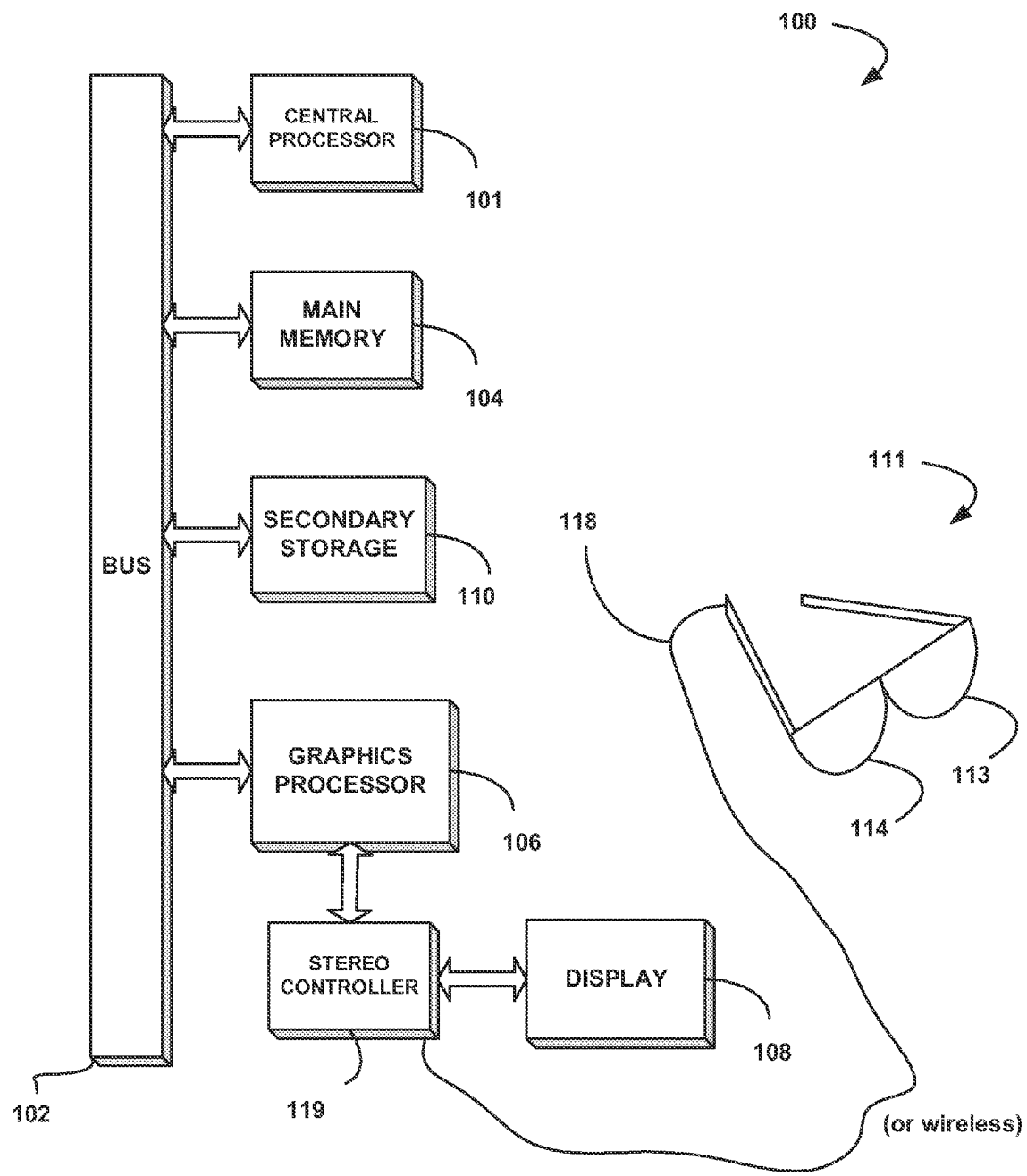
FIG. 1B illustrates an exemplary computer system in which the various architecture and/or functionality of various embodiments may be implemented.
Figure 2:
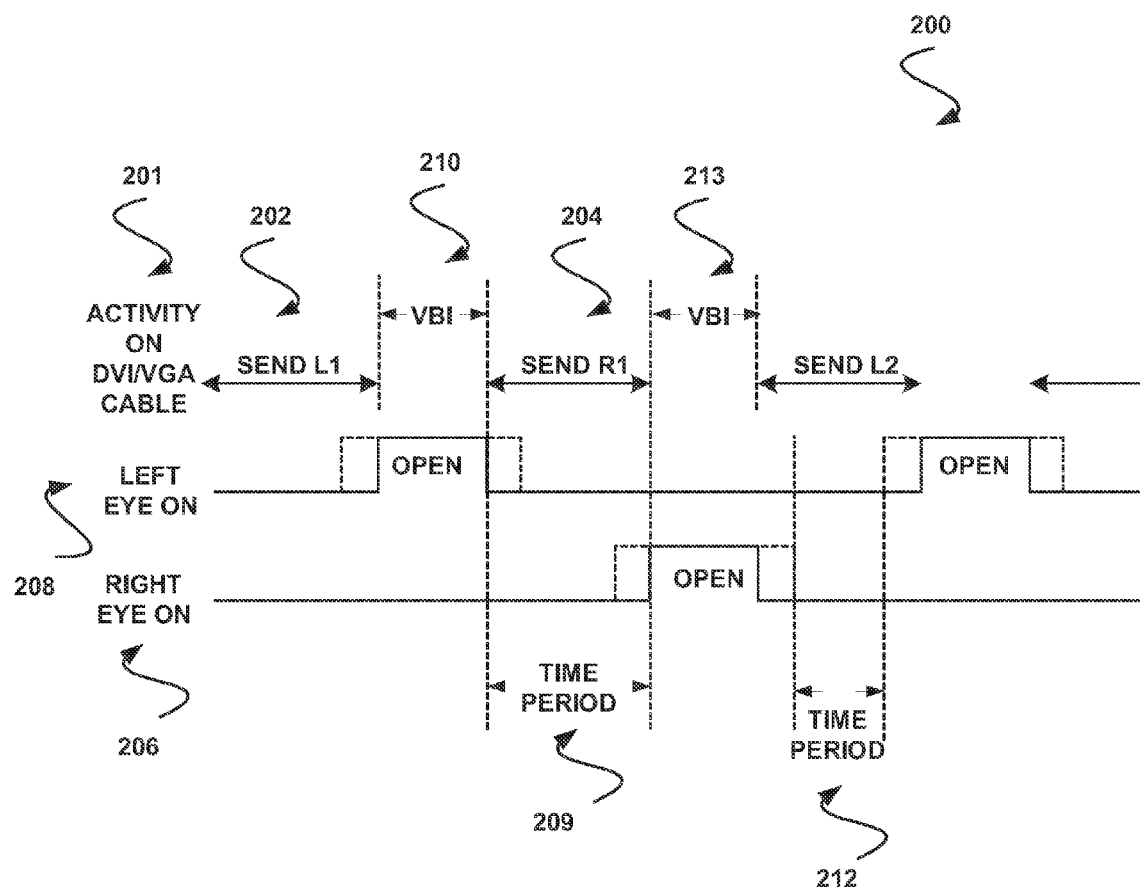
FIG. 2 shows an exemplary timing for enhancing a viewing experience when display content is viewed utilizing stereo glasses, in accordance with one embodiment.

FIG. 2 shows an exemplary timing 200 for enhancing a viewing experience when display content is viewed utilizing stereo glasses, in accordance with one embodiment. As an option, the present timing 200 may be implemented in the context of the computer system 100 of FIG. 1B. Of course, however, the timing 200 may be used in any desired environment. Still yet, the above definitions apply during the following description.

As shown, a display (e.g. display 108 of FIG. 1, etc.) receives display content over a communication medium 201, such as a digital video interface (DVI) or video graphics array (VGA) cable, or any other medium capable of communicating the display content, for that matter. In the context of the present description, such display content may include pixel-related information, image(s), and/or any other content or component thereof at any stage of processing capable of being displayed. In FIG. 2, a first left image L1 intended for viewing only by a left eye is shown to be sent over the communication medium 201 first. Thereafter, there is a pause in transmission, namely the vertical blanking interval VBI. Next, a first right image R1 intended for only the right eye is then sent, and so forth.

As further shown, a right eye shutter and left eye shutter of stereo glasses (e.g. stereo glasses 111, etc.) are controlled independently. In one embodiment, this may be accomplished utilizing a right eye control signal 206 for controlling the right eye shutter and a left control signal 208 for controlling the left eye shutter.

Specifically, the left eye shutter of the stereo glasses may be controlled such that the left eye shutter is in an open orientation at least for the duration of a first set of vertical blanking intervals 210, which follow receipt of display content intended for a left eye. In a similar manner, the right eye shutter of the stereo glasses may be controlled such that the right eye shutter is in the open orientation at least for the duration of a second set of vertical blanking intervals 213, which follow receipt of display content intended for a right eye. As shown, the first set of vertical blanking intervals 210 alternate with the second set of vertical blanking intervals 213, and they both occur between periods during which right eye content or left eye content is received from a content source.

In other embodiments (e.g. particularly in the case of wireless stereo glasses, etc.), the right eye shutter and the left eye shutter of the stereo glasses may be controlled utilizing a plurality of signals (e.g. codes, etc.). In such embodiments, one of such signals may be specifically allocated to cause the right eye shutter and the left eye shutter to simultaneously transition to and remain in the closed orientation. Of course, separate signals may be used to close only the right eye shutter, the left eye shutter, etc.

To this end, a right eye shutter and left eye shutter of the stereo glasses may be controlled such that the right eye shutter and left eye shutter simultaneously remain in the closed orientation for a predetermined amount of time 209. As shown, such predetermined amount of time 209 represents a time during which the first left image L1 has been partially overwritten by the first right image R1. Thus, by ensuring that both the right eye shutter and left eye shutter of the stereo glasses simultaneously remain in the closed orientation during such time, the right eye content is prevented from reaching the left eye and the left eye content is prevented from reaching the right eye.

In the embodiment illustrated in FIG. 2, the left eye shutter of the stereo glasses may be controlled such that the left eye shutter is in the open orientation only for the duration of the first set of vertical blanking intervals 210 (i.e. when only left eye content is being displayed, etc.). Further, the right eye shutter of the stereo glasses may be controlled such that the right eye shutter is in the open orientation only for the duration of the second set of vertical blanking intervals 213 (i.e. when only right eye content is being displayed, etc.). Thus, such predetermined amount of time 209 represents an entire time frame in which the first left image L1 has been partially overwritten by the first right image R1, and so on.

In other embodiments, however, the right eye shutter and the left eye shutter of the stereo glasses may be controlled such that the shutters each remain in the open orientation for an adjustable time period (with the predetermined amount of time 209 being decreased) to permit additional light through each respective shutter. See time period 210, for example. To this end, the eyes of the user may be subjected to more light, thereby enhancing a perceived brightness of an image.

In other words, the left eye shutter of the stereo glasses may be controlled such that the left eye shutter is in the open orientation for a period that exceeds the duration of the first set of vertical blanking intervals 210. Similarly, the right eye shutter of the stereo glasses may be controlled such that the right eye shutter is in the open orientation for a period that exceeds the duration of the second set of vertical blanking intervals 213. Of course, one trade off associated with such option involves increasing the duration in which each eye receives content, at least in part, not intended for such eye. Specifically, at least a portion of left eye content may be displayed when the right eye shutter is in the open orientation, and visa-versa.

As set forth during reference to FIG. 1B, the duration of the vertical blanking interval VBI associated with received display content may be increased for enhancing a viewing experience when the display content is viewed utilizing the stereo glasses. By increasing the duration of the vertical blanking interval VBI, the time period is increased during which each eye receives content wholly intended for such eye, resulting in enhanced stereo viewing of content on the display.

It should be noted that the vertical blanking interval VBI may be increased in any desired manner. For example, before a content source sends data to the display, appropriate display timing specifications may be consulted. This may be accomplished using any desired interface [e.g. extended display data channel/extended display identification data (E-DDC/EDID), video electronics standards organization (VESA) interface, etc.] using the communication medium 201. To this end, the content source may choose one of many established/standard timings and/or tailored timings to send the content, where such timing allows for vertical blanking interval VBI augmentation. Such timings may further be provided/maintained by the manufacturer of the stereo glasses, graphics processor that drives the images using configuration files, etc. More information regarding various exemplary techniques that may be specifically used to increase the duration of the vertical blanking interval VBI in such manner will be set forth in greater detail during reference to subsequent figures.

Figure 3:
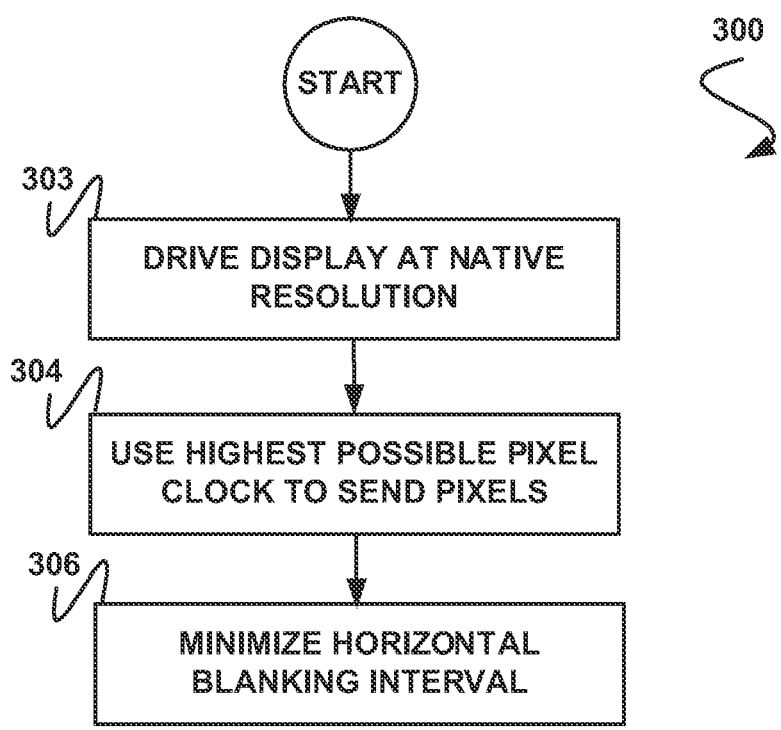
FIG. 3 shows a method for increasing a vertical blanking interval for enhancing a viewing experience when display content is viewed utilizing stereo glasses, in accordance with one embodiment.

FIG. 3 shows a method 300 for increasing a vertical blanking interval for enhancing a viewing experience when display content is viewed utilizing stereo glasses, in accordance with one embodiment. As an option, the present method 300 may be carried out in the context of the computer system 100 of FIG. 1B and/or the timing 200 of FIG. 2. Of course, however, the method 300 may be implemented in any desired environment. Again, the definitions introduced hereinabove apply during the following description.

As shown, a display (e.g. display 108 of FIG. 1, etc.) is driven at a native resolution. See operation 303. Such native resolution may refer to the resolution at which the display is designed to display content without conversion. The native resolution is typically based on an actual number of cells in the display.

Next, a rate at which pixels are sent to the display is increased, utilizing a pixel clock. Specifically, in one embodiment, pixels may be transmitted for display purposes using a highest possible pixel clock. See operation 304. In one exemplary embodiment, such maximum pixel clock may include that which a standard governing a connection cable supports (e.g. 165 Mpix/s for a single link DVI cable, 330 Mpix/s for a dual link DVI cable, etc.). In another embodiment, the foregoing highest possible pixel clock may include a pixel clock limit indicated by the display in related EDID information. Such limit may be the same as, or lower than a DVI cable clock limit.

Still yet, a horizontal blanking interval associated with the display is decreased, as indicated in operation 306. In the context of the present description, the horizontal blanking interval refers to an interval during which processing of successive lines returns from right to left. In one embodiment, the horizontal blanking interval may be chosen to be as small as possible. By maximizing the pixel clock and minimizing the horizontal blanking interval in the foregoing manner, the vertical blanking interval duration may be maximized. The manner in which this is accomplished will become more readily apparent during the description of an example to be set forth later.

An alternate technique for increasing the vertical blanking interval (besides increasing the pixel clock, etc.) may involve the reduction of a display refresh rate. For example, a display designed for a 100 Hz refresh rate with a low vertical blanking interval may be used at 85 Hz with a 19% vertical blanking interval, in one illustrative embodiment.

In various embodiments, the display may be specifically equipped with a plurality of additional timings for increasing the duration of the vertical blanking interval. While the display may be equipped with the additional timings in any one of a variety of ways, it may be accomplished, in one embodiment, by including the same in software stored in memory of the display. In use, such additional timings may each be adapted for either decreasing a horizontal blanking interval associated with the display and/or increasing a rate at which pixels are sent to the display.

Table 1 illustrates one exemplary timing that may be added in the foregoing manner. Of course, such timing is set forth for illustrative purposes only and should not be construed as limiting in any manner. For example, in a VGA environment, such a table may be updated in association with a display while, in a DVI environment, no such change may be necessary.

TABLE 1

Timing Name: 1280x1024 75S

Computed:

| Hor Pixels | 1280 |  |
|---|---|---|
| Ver Pixels | 1024 |  |
| Hor Frequency | 105.00 | kHz |
| Ver Frequency | 75.00 | Hz |
| Pixel Clock | 139.44 | MHz |
| HBlank | 3.6% of Htotal |  |
| VBlank | 26.9% of Vtotal |  |
| Hor Total Time | 1328 | Pixels |
| Hor Addr Time | 1280 | Pixels |
| Hor Blank Start | 1280 | Pixels |
| Hor Blank Time | 48 | Pixels |
| Hor Sync Time | 16 | Pixels |
| Hor Sync Start | 1288 | Pixels |
| H Right Border | 0 | Pixels |
| H Front Porch | 8 | Pixels |
| Hor Sync Time | 16 | Pixels |
| H Back Porch | 24 | Pixels |
| H Left Border | 0 | Pixels |
| Ver Total Time | 1400 | Lines |
| Ver Addr Time | 1024 | Lines |
| Ver Blank Start | 1024 | Lines |
| Ver Blank Time | 376 | Lines |
| Ver Sync Start | 1040 | Lines |
| V Bottom Borde | 0 | Lines |
| V Front Porch | 16 | Lines |
| Ver Sync Time | 112 | Lines |
| V Back Porch | 248 | Lines |
| V Top Border | 0 | Lines |

It should be noted that the aforementioned horizontal blanking interval is less important in the context of LCD, DLP-type displays, etc., thereby providing an opportunity for sacrificing the same to extend the vertical blanking interval. In particular, in CRT-type displays, such horizontal blanking is typically augmented (e.g. in the range of 15-25%, etc.) to allow re-tracing to a beginning of a particular scan line. For example, a CRT-type display may display a first line of X number of pixels after which a horizontal blanking interval may be used to provide time for the display to re-trace to the beginning of the scan line so that another line of X number of pixels may be displayed, and so forth.

Equation #1 illustrates the interrelationship between the horizontal blanking interval and the vertical blanking interval.

$$f_{pix}=(pixels\_X\text{-direction}+HBI)*(pixels\_Y\text{-direction}+VBI)*f_v$$

where $f_{pix}$=pixel rate
HBI=# of pixels in horizontal blanking interval
pixels_X-direction=# of pixels in X-direction for predetermined resolution
VBI=# of pixels associated in vertical blanking interval
pixels_Y-direction=# of pixels in Y-direction for predetermined resolution
$f_v$=refresh rate As shown, a horizontal blanking interval may be sacrificed for an extended vertical blanking interval (particularly with LCD, DLP-type displays, etc.), without necessarily affecting the pixel rate and the refresh rate.

Thus, in one embodiment, the foregoing timing of Table I may provide an alternate 1280×1024 75 Hz stereo compatible timing specification that may co-exist with existing VESA 1280×1024 75 Hz timing specifications. In such exemplary embodiment, the existing 1280×1024 75 Hz VESA timing employs 24.2% of available time for horizontal blanking and 3.9% for vertical blanking, whereas the stereo compatible timing employs close to 27% of available time for vertical blanking and less than 4% for horizontal blanking.

Figure 4:
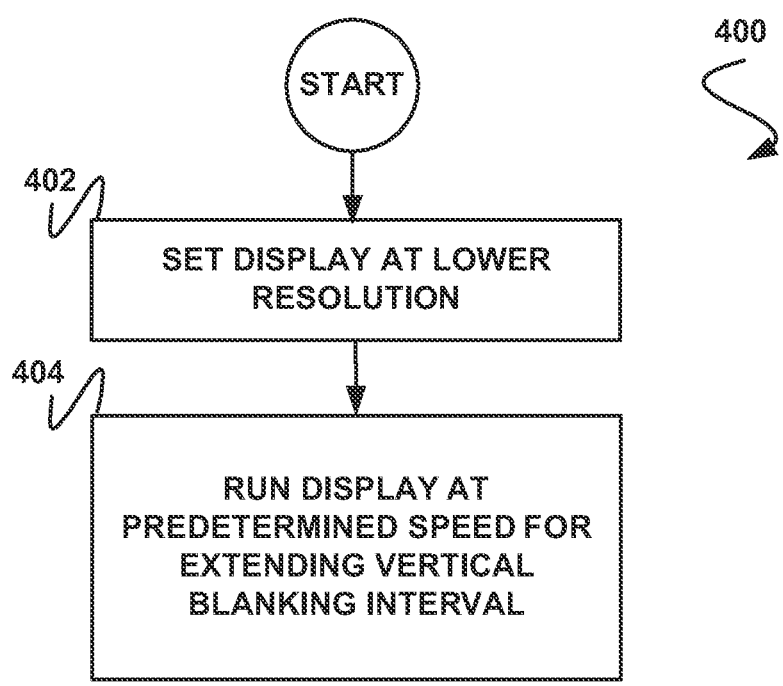
FIG. 4 shows a method for increasing a vertical blanking interval for enhancing a viewing experience when display content is viewed utilizing stereo glasses, in accordance with another embodiment.

FIG. 4 shows a method 400 for increasing a vertical blanking interval for enhancing a viewing experience when display content is viewed utilizing stereo glasses, in accordance with another embodiment. As an option, the present method 400 may be carried out in the context of the computer system 100 of FIG. 1B and/or the timing 200 of FIG. 2. Of course, however, the method 400 may be implemented in any desired environment. Yet again, the definitions introduced hereinabove apply during the following description.

As shown, a display (e.g. display 108 of FIG. 1, etc.) may be set at a lower resolution during use. See operation 402. Still yet, the display may be run at a predetermined speed for extending the vertical blanking interval. Note operation 404. An example of such technique is set forth below.

Specifically, in one optional embodiment, a display may be provided that is designed for a 1600×1200 resolution, but is used at a lower resolution such as 1024×768. If such display supports the 1600×1200 resolution at 60 Hz (in accordance with the VESA standard), it is likely capable of 162 Mpix/s (in any resolution). Thus, by sending the display 1024*768 pixels with a 162 MHz pixel clock, an entire image (assuming 100 pixel horizontal blanking) may be sent in 5.33 ms (1144*768*6.173e−9). Since images at 60 Hz are received every 16.66 msec, the vertical blanking interval may thus be extended to 11.33 msec (16.66−5.33). To this end, each shutter of a pair of stereo glasses (e.g. stereo glasses 111 of FIG. 1, etc.) may remain in an open orientation for 11.33 msec out of every 33.33 msec, thereby providing a duty cycle of 34% (out of a theoretical maximum of 50%).

In one embodiment, the foregoing functionality of FIGS. 3-4 may optionally be provided by utilizing a controller (e.g. stereo controller 119 of FIG. 1, etc.) coupled to the display. In the context of the present embodiment, such controller may be employed for tapping signals in a cable feeding the display to retrieve triggering information for the glasses (e.g. stereo glasses 111 of FIG. 1, etc.). Such triggering information may be derived from a vertical synchronization in the cable, along with left/right eye shutter identifying information associated with the content (e.g. white line codes, etc.) or software-provided control signals (e.g. DDC signal, etc.).

In another embodiment, the method 300 of FIG. 3 and the method 400 of FIG. 4 may be provided by interrupting two I2C® interface wires that typically carry EDID standard information. In an embodiment where the controller takes the form of a microcontroller, such hardware may read original display EDID information and present modified EDID information to the associated computer system. In such embodiment, drivers that use the EDID information to compute timing settings need not necessarily be modified.

Figure 5:
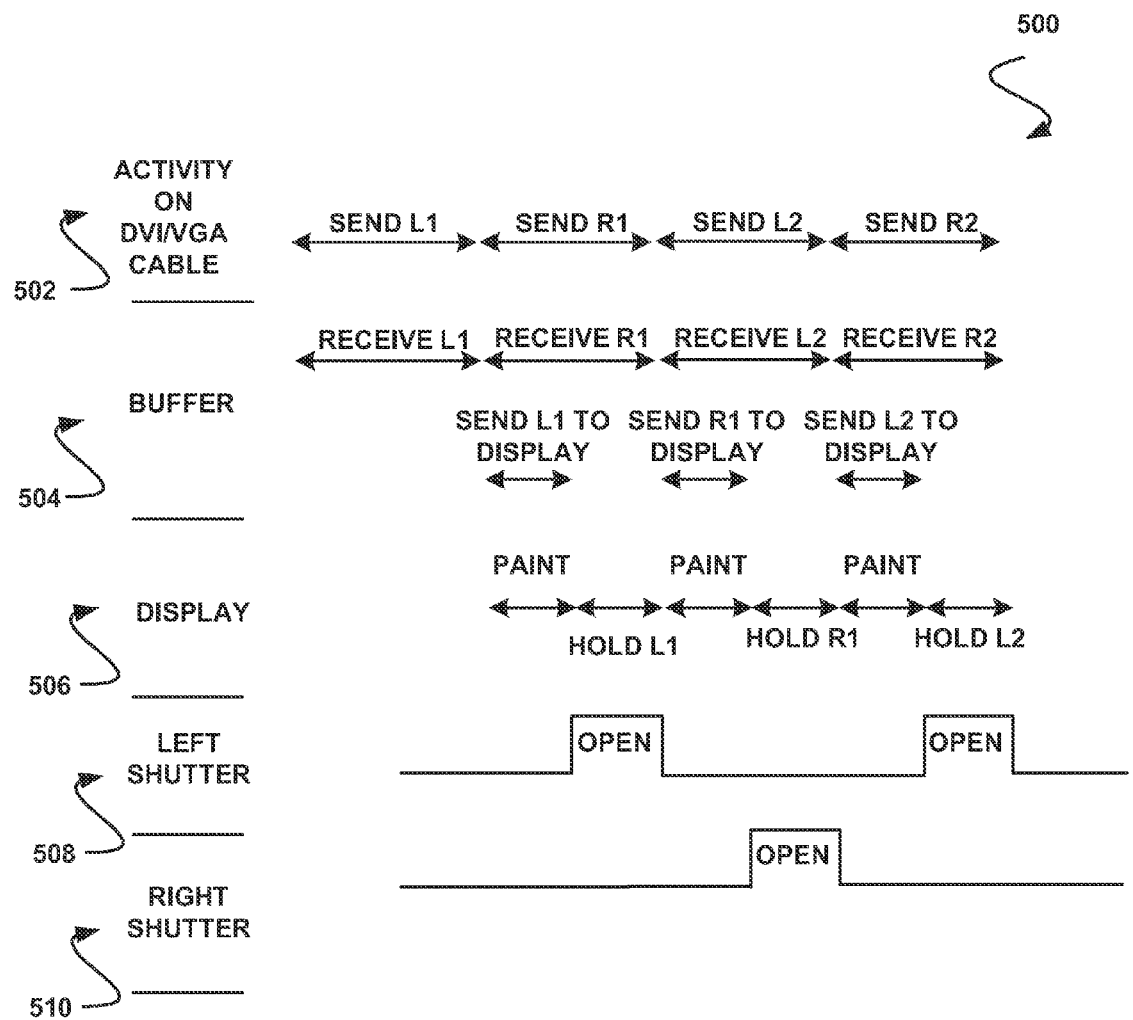
FIG. 5 shows an exemplary timing for use when display content is viewed utilizing stereo glasses and an LCD or the like, in accordance with yet another embodiment.

FIG. 5 shows an exemplary timing 500 for use when display content is viewed utilizing stereo glasses and an LCD or the like, in accordance with yet another embodiment. As an option, the present timing 500 may be implemented in the context of the computer system 100 of FIG. 1B and/or the timing 200 of FIG. 2. Of course, however, the timing 500 may be used in any desired environment.

In the present embodiment, display content sent to a display (e.g. display 108 of FIG. 1, etc.) in operation 502 may, in turn, be received and buffered in the manner shown in operation 504. As an option, such buffering may be carried out utilizing buffer memory (e.g. DRAM, etc.) resident in the display or in any other location, for that matter.

Once the display content for a particular eye is received and buffered in operation 504, it may be sent from the buffer to the display, as further indicated in operation 504. To this end, the display may paint the particular display content currently being sent from the buffer. Note operation 506. Note that, after the display content for a particular eye has been sent and painted, such display content may be held in the manner shown.

By this design, the left and right eye shutter of a pair of stereo glasses (e.g. stereo glasses 111 of FIG. 1, etc.) may be opened during the time period when the corresponding display content is being held. Note operations 508 and 510, respectively. By buffering the display content in operation 504 in the foregoing manner, any lengthy time necessary for the display content to cross the cable to the buffer is available, thus keeping the pixel clock low. Further, when the display content is buffered and ready for display, the display content may be transferred rapidly to the display, so that it may be held and displayed to a respective eye for a longer time. Thus, a stable time of the display content may be increased by buffering the display content in the foregoing manner, while avoiding a need to increase the vertical blanking interval on a display interface cable, etc.

In summary, display content received from a content source may be buffered for a predetermined eye until a full image of display content for such eye is available. While such buffering is taking place, previous display content for the other eye may be displayed. When such buffering is complete and the image is stable, the full image of display content for such eye may be transferred from the buffer to the display for the duration of the vertical blanking interval or longer. Further, such transfer may be carried out at a maximum pixel rate that the display is capable of handling internally so that the vertical blanking interval is capable of being maximized. If such interval is too short, additional buffering that can temporarily receive and store the next incoming image may be employed. To this end, a duration in which the eye shutters may be maintained in the open orientation may be extended (and hence maximize screen brightness, etc.).

Strictly as an option, a backlight of the display may be activated only when at least one of the shutters is in the open orientation. This feature may be applied in the context of flashing or scrolling backlights. In the case of a flashing backlight, the backlight may be flashed for 30% of the time (for example), but may also use a light with triple the magnitude, in order to provide normal light output. To this end, the present feature may be used to avoid wasting light (and associated power) when the shutters are closed, and further avoid excessive heat. As an option, the foregoing backlight activation may be performed utilizing techniques set forth in a co-pending application filed Jan. 27, 2005 under application Ser. No. 11/045,239, which is incorporated herein by reference in its entirety.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A stereo glasses apparatus, comprising:
    a right eye shutter of stereo glasses operable to switch between a closed orientation and an open orientation; and
    a left eye shutter the stereo glasses operable to switch between the closed orientation and the open orientation;
    wherein the right eye shutter and the left eye shutter of the stereo glasses are operable such that the right eye shutter and the left eye shutter simultaneously remain in the closed orientation for a predetermined amount of time;
    wherein the right eye shutter of the stereo glasses is operable such that the right eye shutter is in the open orientation only for a duration of a first set of vertical blanking intervals, and the left eye shutter of the stereo glasses is operable such that the left eye shutter is in the open orientation only for a duration of a second set of vertical blanking intervals, by:
    (a) holding the right eye shutter and the left eye shutter of the stereo glasses in the closed orientation during painting, by a display, of right display content intended for viewing by a right eye of a viewer,
    (b) after the right display content is painted by the display, and during a vertical blanking interval of the first set of vertical blanking intervals which is when the right display content is held on the display by no update occurring by the display, holding the right eye shutter of the stereo glasses in the open orientation and the left eye shutter of the stereo glasses in the closed orientation,
    (c) after the right display content is held on the display during the vertical blanking interval of the first set of vertical blanking intervals, holding the right eye shutter and the left eye shutter of the stereo glasses in the closed orientation during painting, by the display, of left display content intended for viewing by a left eye of the viewer,
    (d) after the left display content is painted by the display, and during a vertical blanking interval of the second set of vertical blanking intervals which is when the left display content is held on the display by no update occurring by the display, holding the left eye shutter of the stereo glasses in the open orientation and the right eye shutter of the stereo glasses in the closed orientation, and (e) repeating (a) after the left display content is held on the display during the vertical blanking interval of the second set of vertical blanking intervals.

2. The apparatus as recited in claim 1, wherein the right eye shutter and the left eye shutter of the stereo glasses are controlled independently.

3. The apparatus as recited in claim 1, wherein the right eye shutter and the left eye shutter of the stereo glasses are controlled independently utilizing a first control signal for controlling the right eye shutter and a second control signal for controlling the left eye shutter.

4. The apparatus as recited in claim 1, wherein the right eye shutter and the left eye shutter of the stereo glasses are controlled utilizing a plurality of signals, one of which causes the right eye shutter and the left eye shutter to simultaneously transition to and remain in the closed orientation.

5. The apparatus as recited in claim 1, wherein the right eye shutter and the left eye shutter of the stereo glasses are controlled to permit stereo viewing of content on the display.

6. The apparatus as recited in claim 5, wherein the display includes a liquid crystal display.

7. The apparatus as recited in claim 5, wherein the content includes stereo content.

8. The apparatus as recited in claim 5, wherein the content is buffered utilizing buffer memory resident in the display.

9. The apparatus as recited in claim 5, wherein the content is buffered utilizing buffer memory resident in a location other than a computer system, the computer system including a central processing unit and memory connected via at least one bus.

10. The apparatus as recited in claim 9, wherein the location other than the computer system includes the display.

11. The apparatus as recited in claim 5, wherein a backlight of the display is activated only when one of the shutters is in the open orientation.

12. The apparatus as recited in claim 1, wherein the right eye shutter and the left eye shutter of the stereo glasses is controlled to switch between the closed orientation and the open orientation.

13. The apparatus as recited in claim 12, wherein the controlling is performed utilizing a controller connected to a computer system via a universal serial bus interface.

14. The apparatus as recited in claim 13, wherein the controller is in communication with the stereo glasses, the display, and a graphics processor.

15. A method, comprising:
controlling a right eye shutter of stereo glasses to switch between a closed orientation and an open orientation; and
controlling a left eye shutter the stereo glasses to switch between the closed orientation and the open orientation;
wherein the right eye shutter and the left eye shutter of the stereo glasses are controlled such that the right eye shutter and the left eye shutter simultaneously remain in the closed orientation for a predetermined amount of time;
wherein the right eye shutter of the stereo glasses is controlled such that the right eye shutter is in the open orientation only for a duration of a first set of vertical blanking intervals, and the left eye shutter of the stereo glasses is controlled such that the left eye shutter is in the open orientation only for a duration of a second set of vertical blanking intervals, by:

(a) holding the right eye shutter and the left eye shutter of the stereo glasses in the closed orientation during painting, by a display, of right display content intended for viewing by a right eye of a viewer, (b) after the right display content is painted by the display, and during a vertical blanking interval of the first set of vertical blanking intervals which is when the right display content is held on the display by no update occurring by the display, holding the right eye shutter of the stereo glasses in the open orientation and the left eye shutter of the stereo glasses in the closed orientation, (c) after the right display content is held on the display during the vertical blanking interval of the first set of vertical blanking intervals, holding the right eye shutter and the left eye shutter of the stereo glasses in the closed orientation during painting, by the display, of left display content intended for viewing by a left eye of the viewer, (d) after the left display content is painted by the display, and during a vertical blanking interval of the second set of vertical blanking intervals which is when the left display content is held on the display by no update occurring by the display, holding the left eye shutter of the stereo glasses in the open orientation and the right eye shutter of the stereo glasses in the closed orientation, and (e) repeating (a) after the left display content is held on the display during the vertical blanking interval of the second set of vertical blanking intervals.

16. A computer program product embodied on a non-transitory computer readable medium, comprising:
computer code for controlling a right eye shutter of stereo glasses to switch between a closed orientation and an open orientation; and
computer code for controlling a left eye shutter the stereo glasses to switch between the closed orientation and the open orientation;
wherein the computer program product is operable such that the right eye shutter and the left eye shutter of the stereo glasses are controlled such that the right eye shutter and the left eye shutter simultaneously remain in the closed orientation for a predetermined amount of time;
wherein the computer program product is operable such that the right eye shutter of the stereo glasses is controlled such that the right eye shutter is in the open orientation only for a duration of a first set of vertical blanking intervals, and the left eye shutter of the stereo glasses is controlled such that the left eye shutter is in the open orientation only for a duration of a second set of vertical blanking intervals, by:

(a) holding the right eye shutter and the left eye shutter of the stereo glasses in the closed orientation during painting, by a display, of right display content intended for viewing by a right eye of a viewer, (b) after the right display content is painted by the display, and during a vertical blanking interval of the first set of vertical blanking intervals which is when the right display content is held on the display by no update occurring by the display, holding the right eye shutter of the stereo glasses in the open orientation and the left eye shutter of the stereo glasses in the closed orientation, (c) after the right display content is held on the display during the vertical blanking interval of the first set of vertical blanking intervals, holding the right eye shutter and the left eye shutter of the stereo glasses in the closed orientation during painting, by the display, of left display content intended for viewing by a left eye of the viewer, (d) after the left display content is painted by the display, and during a vertical blanking interval of the second set of vertical blanking intervals which is when the left display content is held on the display by no update occurring by the display, holding the left eye shutter of the stereo glasses in the open orientation and the right eye shutter of the stereo glasses in the closed orientation, and (e) repeating (a) after the left display content is held on the display during the vertical blanking interval of the second set of vertical blanking intervals.

* * * * *